March 10, 1942.  W. J. MOELLER  2,276,083
MOLDED CEMENT PRODUCT AND MANUFACTURE OF SAME
Filed Sept. 6, 1935  2 Sheets-Sheet 1
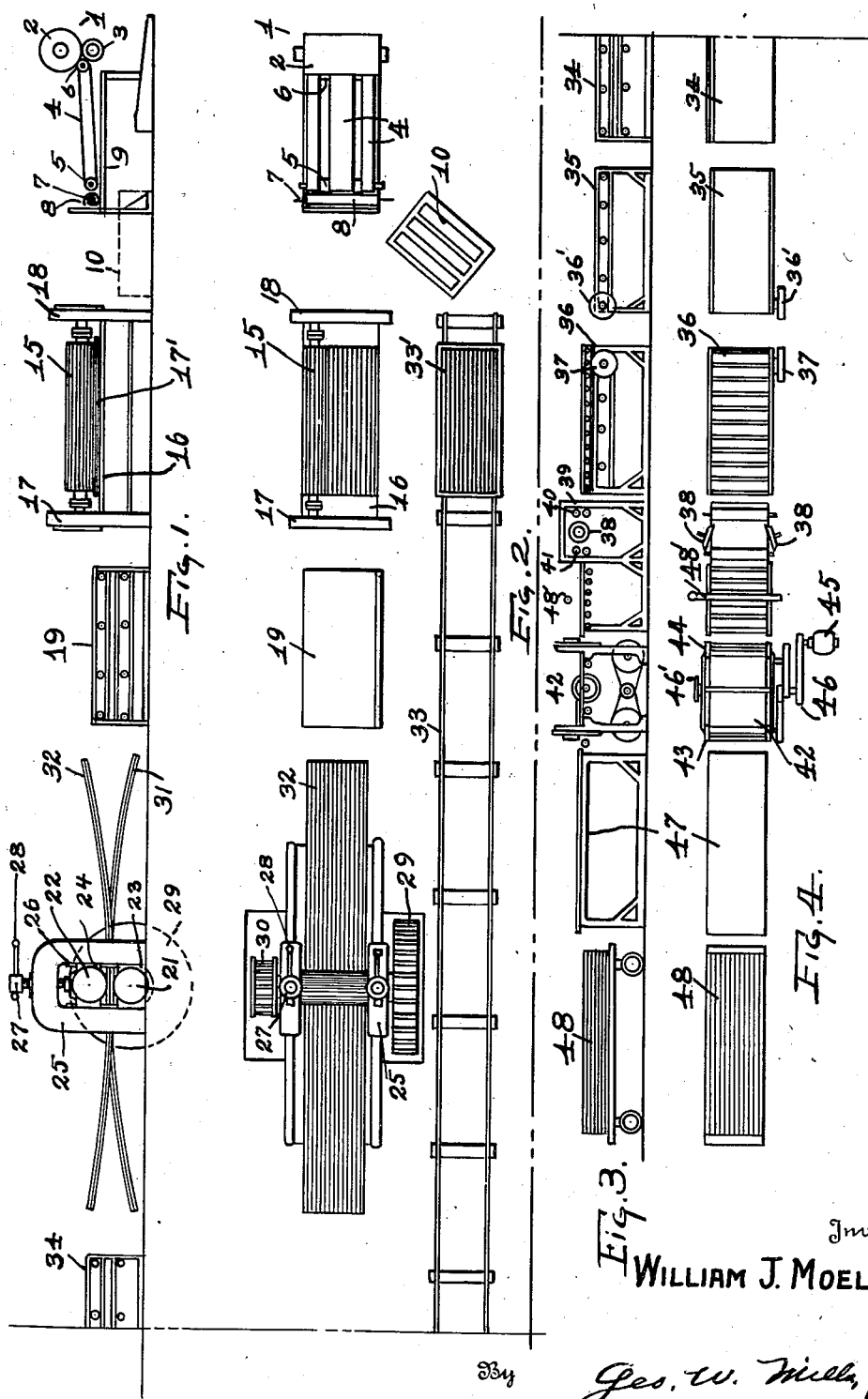
Inventor
WILLIAM J. MOELLER.
By Geo. W. Mills, Jr.
Attorney March 10, 1942.　　　W. J. MOELLER　　　2,276,083
MOLDED CEMENT PRODUCT AND MANUFACTURE OF SAME
Filed Sept. 6, 1935　　　2 Sheets-Sheet 2
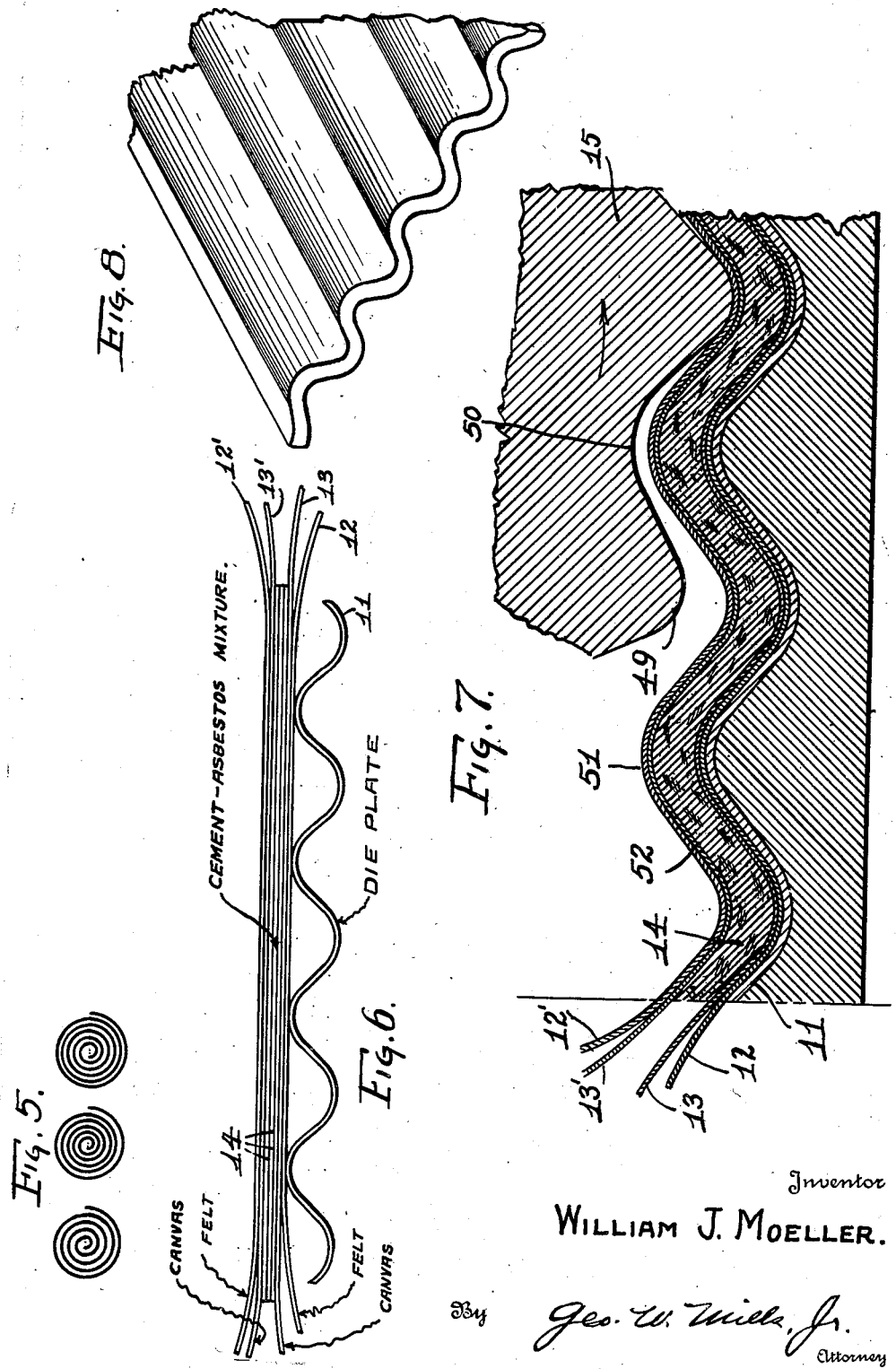
Inventor
WILLIAM J. MOELLER.
By Geo. W. Mills, Jr.
Attorney Patented Mar. 10, 1942

2,276,083

UNITED STATES PATENT OFFICE 2,276,083

MOLDED CEMENT PRODUCT AND MANUFACTURE OF SAME

William J. Moeller, Mount Healthy, Ohio, assignor to The Philip Carey Manufacturing Company, a corporation of Ohio Application September 6, 1935, Serial No. 39,450

23 Claims. (Cl. 154—33.05)

This invention relates to moldable products and the method and apparatus for manufacturing same, and particularly pertains to the manufacture of hydraulic moldable products such as asbestos-cement compositions which are first mixed in a homogeneous mass and then subjected to pressure and drying for being molded into sheets, blocks or the like. The sheets are ordinarily provided with corrugations in order to stiffen and rigidify them, and the corrugations are preferably formed when the sheets are built up into ultimate thickness from any number of layers fabricated on a wet machine.

It is the aim of the invention to produce molded products which are more uniform in character, particularly as to density, and which are molded without any imperfections in the exposed faces.

In corrugating the molded products, it has heretofore been the practice to place on opposite sides of the sheet to be corrugated layers of woven fabric which are relatively thin and flexible. These fabric layers cooperate in dehydrating the products being molded and also impart a texture to the exposed faces of the resultant products. The fabric layers, however, being relatively thin and flexible, are easily wrinkled, and accordingly impart the forms of the wrinkles to the molded products, thereby causing defects and imperfections therein.

It is the aim of the present invention to prevent wrinkling of the woven fabric layers, and also to allow for some flow of the product being molded so that the pressure by the corrugating dies is equalized at all points, causing all portions of the product to be uniform in density and homogeneous in character.

Generally described the invention is typified by a felt sheet preferably used in conjunction with the woven fabric sheet, the felt sheet being of substantial thickness as compared therewith. A felt sheet is applied on opposite faces of the product being molded, the same being interposed between the woven fabric sheet and the adjacent die, thereby having the woven fabric sheet in contact with the product and the felt sheet in contact with the face of the die. Use of the felt layers not only prevents wringling of the woven fabric layers, but prolongs their serviceable life. Flow of the product being molded is permitted, thereby making same of more uniform character. Dehydration of the products being molded is accelerated.

For a better understanding of the invention, reference may be made to the accompanying drawings in which—

Fig. 1 is a side elevation, diagrammatic or schematic, of one part of a machine embodying the invention;

Fig. 2 is a top plan view of that part of the machine shown in Fig. 1 and of a conveyor disposed alongside thereof;

Fig. 3 is a side elevation, diagrammatic or schematic, of the other part of the machine continuing from the left hand side of Fig. 1;

Fig. 4 is a top plan view of Figure 3;

Fig. 5 is an end elevational view of a plurality of rolls which have been fabricated on the wet machine;

Fig. 6 is a detailed view in cross-section of a product assembled on a die plate preliminary to being subjected to a corrugating roll;

Fig. 7 is a detailed view showing the sheet being subjected to a corrugating roll; and Fig. 8 is a perspective view of the molded corrugated product.

Referring to the drawings in which like numerals are used to designate like parts, a sheet of asbestos-cement material is formed on a conventional wet machine, the delivery end of which is designated by numeral 1. A sheet is built up to the desired thickness on the roll 2 having a pressure roll 3 cooperating therewith. After the sheet has been built up to the desired thickness on the roll, it is removed therefrom and deposited on the conveyor 4, disposed adjacent the delivery end of the wet machine over rolls 5 and 6. From the conveyor the sheet is received on a core rod 7 and rolled into a roll 8 on the take off table 9 and then transferred to any suitable accumulator or roll supply rack 10. As the products are precorrugated, they are built up to desired thickness by any number of layers composed of sheets unrolled from rolls 8 in superposed relation. These are preferably superposed on the die plate 11 which is of corrugated contour, the corrugations being disposed lengthwise. In building up the sheets for corrugating, a layer of felt 12 is spread over the face of the die and then a sheet of woven fabric 13, such as canvas, is laid over the felt. A suitable number of asbestos-cement layers 14, in this instance three, are then superposed upon the die with the bottom layer in direct contact with the sheet 13, and the sheet 12 in direct contact with the face of the die. The three superposed layers 14 are then overlaid with another woven fabric sheet 13' and felt 12', these being of the same character and in the same arrangement as previously described sheets 12 and 13. The felt sheet 12' is uppermost and exposed to be contacted by the other die element which in the present instance is typified by a corrugated roll 15 which is suitably mounted adjacent support 16 on which the other die may be placed with the other parts in assembled relation thereon as described. A base plate 17 having a face complementary with the die plate may be advantageously associated with the support 16 for contacting with said die plate. The corrugating roll 15 is supported in standards 17 and 18 disposed on opposite ends and driven by any suitable means to rotate the roll and reciprocate same in the standards relatively to the stationary die plate and precorrugate the sheet. The precorrugated sheet with the die plate and other assembled woven and felted sheets are disposed upon the accumulator table or rack 19 provided at different levels with any number of idle rolls, from which it is later fed to the presser 20. The presser is typified by two spaced apart rolls 21 and 22 journalled in respective journal blocks 23 and 24, one of which, 21, is fixed in standards 25 and the other, 22, of which is adjustably mounted therein on guides 26 disposed between the journal block and the standard. Adjustment is effected by a screw device 27 having one end connected with the journal block and another part screw threadedly associated with the standard. A lever arm 28 is mounted on the top end of the adjusting screw and may be manually manipulated to suitably space the adjustable roller from the fixed roller. One of the rolls, for example the lower roll, may have a gear wheel 29 mounted on one end thereof and adapted to be driven from any suitable source of power and the other end may have another gear 30 adapted to mesh with a similar complemental gear on the other roll so that both rolls may be positively driven. Interposed between the two pressure rolls are a lower corrugated plate 31 and an upper corrugated plate 32 of arcuate or bowed form arranged in contiguous relation. These are preferably co-extensive in length and breadth and are corrugated to the contour of the sheets in conformity with the corrugations which have been formed thereon by the preliminary corrugating roll. The die plate carrying the product to be molded between the woven and felted sheets is placed between the two plates at one end and then fed between the pressure rolls. Alongside of the presser device extending from the precorrugator there may preferably be provided a trackway 33 and a wheeled truck or conveyor 33' in order that the precorrugated sheets may be readily conveyed for being fed to either end of the presser device and that it may be filled each time that the plates are reciprocated between the rolls so as to make it double acting in speed of operation. A die charging and discharging rack 34, similar to that adjacent the other end, is provided. Those sheets which are discharged from the racks adjacent the presser are advantageously deposited on a receiver stand 35 where they are stripped from the die plates and then transferred to stand 36 and separated from the fabric layers on the other side. The fabric layers on the upper side are usually removed as soon as the sheets have been fed through the presser device. As the formed asbestos-cement sheet is being fed to the side trimmers, the fabric layers are removed between the two end rollers adjacent the side trimmers. The fabric layers may be repeatedly used in the operations as long as serviceable.

One of the rolls on the receiving stand is provided with a pulley drive 36'. So, too, is one of the conveyor rolls on the stripper stand provided with a pulley drive 37 for actuating the dies and sheets thereon. From the stripper stand the molded sheets are fed to a trimming device where they are trimmed along their side edges by side trimmers 38 mounted on a rack 39 with a set of idle rolls 40 and 41 disposed on each side. After being trimmed to proper width, the sheet is traversed to a transverse cutter 42 which comprises spaced apart knives 43 and 44 disposed to sever the sheet at each end into proper lengths. The knives are actuated by any source of power, typified by motor 45 with suitable interconnected gearing 46. Spacing of the transverse cutters may be effected by any suitable means typified by manually adjusted hand wheel 46'. The same or another motor mounted upon rack 39 may be employed to actuate the side trimmers. The sheets now having been trimmed to proper widths and cut transversely into desired lengths are completely fabricated and need only to be dried. They may be removed from the take-off table 47 and stacked with intervening die plates on truck 48 for being conveyed to a drying chamber. Sometime during the movement of the sheets subsequent to the pressing operations on the presser and before their discharge on the take-off table, an air blast may be blown through pipe 48' against the top surface of the sheet to remove any dust or dirt that may have settled thereon subsequently to removal of the fabric covering.

In connection with the above, the felt sheets are relatively thick as compared with the canvas sheets which are relatively thin. The canvas sheets are laid next to the asbestos-cement sheets and the felt sheets are associated therewith to prevent any wrinkling of the canvas which if wrinkled would cause a defect in the surface of the asbestos-cement sheet. Inasmuch as the felt sheets are relatively thick they provide a substantially thick resilient area between the die and the asbestos-cement sheet which is being formed and as a result permit the asbestos-cement mixture to slightly flow and fill up any depressions so that the resulting sheet will be uniform in thickness and density. If only the thin canvas sheets are employed and there were no relatively thick sides or resilient sheets, adequate flow or yielding would not be permitted and as a result the pressure against the different portions of the asbestos-cement sheet would be irregular, some portions receiving a greater degree of pressure than others and inasmuch as the asbestos-cement material would not be adapted to flow the resultant sheets would have portions therein which were of greater density than other parts.

The crests of the corrugations 49 on the corrugating roll are somewhat lesser in curvature than that of the intervening grooves 50 between the corrugations, thereby pressing the material so that the area throughout the crests of the corrugations 51 in the resulting sheet are somewhat thicker than that at the base of the grooves 52 between the crests of the corrugations. This increases the thickness and strength of the sheet at the corrugated portions rather than having them of lesser strength than would otherwise be the case and also serves to have the crests full and rounded.

While the invention has been described in detail, particularly in respect to one preferred embodiment, it will be understood that there may be various changes in detail without departure from the spirit thereof.

I claim:

1. A method of fabricating hydraulic cement sheets comprising molding a sheet of hydraulic cement with an absorbent resilient felt fabric interposed between the cement and the mold.

2. A method of fabricating hydraulic cement sheets comprising molding a sheet of hydraulic cement with an absorbent resilient sheet and a woven fabric interposed between the cement and the mold, said absorbent resilient sheet being between the woven fabric and the mold.

3. A method of fabricating hydraulic cement sheets comprising molding a sheet of hydraulic cement with a felt fabric and a woven fabric interposed between the cement and the mold, said woven fabric being in contact with the cement.

4. A method of fabricating hydraulic cement sheets comprising preforming a sheet of hydraulic cement, and molding said preformed sheet with an absorbent resilient sheet interposed between a woven fabric and the mold.

5. A method of fabricating hydraulic cement sheets comprising preforming a sheet of hydraulic cement, and molding said preformed sheet with a felt fabric interposed between a woven fabric and the mold.

6. A method of fabricating hydraulic cement sheets comprising preforming a sheet of hydraulic cement, and molding said preformed sheet with a felt fabric and a woven fabric interposed between the cement and the mold, said woven fabric being in contact with the cement.

7. A method of fabricating corrugated hydraulic cement sheets comprising molding a sheet of hydraulic cement in a corrugated mold with an absorbent resilient felt fabric interposed between the cement and the mold.

8. A method of fabricating corrugated hydraulic cement sheets comprising molding a sheet of hydraulic cement in a corrupgated mold with an absorbent resilient sheet and a woven fabric interposed between the cement and the mold, said resilient sheet being between the woven fabric and the mold.

9. A method of fabricating corrugated hydraulic cement sheets comprising molding a sheet of hydraulic cement in a corrugated mold with an felt fabric and a woven fabric interposed between the cement and the mold, said woven fabric being in contact with the cement.

10. A method of fabricating hydraulic cement sheets comprising preforming a sheet of hydraulic cement, placing the preformed sheet upon a corrugated plate with a felt fabric and woven fabric interposed therebetween with the woven fabric in contact with the cement sheet, covering the cement sheet with a felt fabric and a woven fabric, said woven fabric being contiguous to said cement sheet, and compressing the sheet between the fabrics.

11. A method of fabricating hydraulic cement sheets comprising preforming a sheet of hydraulic cement, placing the preformed sheet upon a corrugated plate with a felt fabric and woven fabric interposed therebetween with the woven sheet in contact with the cement sheet, covering the cement sheet with a felt fabric and a woven fabric, said fabric being contiguous to said cement sheet, and rolling the cement sheet with a corrugating device applied to the exposed felt fabric to corrugate said cement sheet.

12. A method of fabricating hydraulic cement sheets comprising preforming a sheet of hydraulic cement, placing the preformed sheet upon a corrugated plate with a felt fabric and woven fabric interposed therebetween with the woven sheet in contact with the cement sheet, covering the cement sheet with a felt fabric and woven fabric, said fabric being contiguous to said cement sheet, rolling the cement sheet with a corrugating device applied to the exposed felt fabric to precorrugate said cement sheet, applying another similar corrugated plate to the exposed side of the felt fabric, and then subjecting the cement sheet to pressure for squeezing out the water from same.

13. A method of fabricating hydraulic cement sheets comprising preforming two or more sheets of hydraulic cement, superposing these two or more sheets upon a corrugated plate with a felt fabric and woven fabric interposed between the cement sheets and the plate, the felt fabric being contiguous to the plate, covering the cement sheet with a felt fabric and a woven fabric, said woven fabric being contiguout to the sheet, and compressing the sheet between the fabric sheet.

14. A method of fabricating hydraulic cement sheets comprising preforming two or more sheets of hydraulic cement, superposing these two or more sheets upon a corrugated plate with a felt fabric and woven fabric interposed between the cement sheets and the plate, the felt fabric being contiguous to the plate, covering the cement sheet with a felt fabric and a woven fabric, said woven fabric being contiguous to the sheet, precorrugating the sheet, applying a similar corrugated sheet upon the exposed felt fabric, and then subjecting the sheet to pressure for squeezing out the water from same.

15. A method of fabricating hydraulic cement sheets comprising molding a sheet of hydraulic cement in a mold with a substantially thick resilient sheet interposed between the sheet and the mold.

16. A method of fabricating corrugated hydraulic cement sheets comprising molding a sheet of hydraulic cement in a corrugated mold with a substantially thick resilient sheet interposed between the sheet and the mold.

17. Apparatus for fabricating hydraulic cement sheets comprising a molding die and an absorbent resilient felted sheet covering the face of the molding die and providing a supporting layer between the said die and material being molded.

18. Apparatus for fabricating hydraulic cement sheets comprising a molding die, and two fabric sheets covering the face of the molding die and providing a supporting layer between the said die and material being molded, one of said sheets being woven fabric and the other sheet being a relatively thick resilient sheet interposed between the molding die and the woven fabric.

19. A method of fabricating hydraulic cement sheets comprising molding a sheet of hydraulic cement with an absorbent elastic body interposed between the cement and the mold.

20. A method of fabricating hydraulic cement sheets comprising molding a sheet of hydraulic cement with an absorbent elastic body and a woven fabric interposed between the cement and the mold, said elastic body being between the mold and the woven fabric.

21. A method of fabricating a composition sheet comprising molding a mass of composition material into a sheet with a felt fabric and a woven fabric interposed between the mass and the mold, said felt fabric being between the mold and the woven fabric.

22. A method of fabricating a corrugated composition sheet comprising molding a mass of composition material into a sheet in a corrugated mold with a felt fabric and a woven fabric interposed between the mass and the mold, said felt fabric being between the mold and the woven fabric.

23. A method of fabricating a composition sheet comprising preforming a sheet from a mass of composition material, placing the preformed sheet upon a corrugated plate with a felt fabric and woven fabric interposed therebetween with the woven fabric in contact with said sheet, covering the sheet with a felt fabric and a woven fabric, said woven fabric being contiguous to said sheet, and compressing the sheet between the fabric sheet.

WILLIAM J. MOELLER.